United States Patent [19]

Kurei et al.

[11] 4,118,725
[45] Oct. 3, 1978

[54] SHUTTER SPEED DISPLAY FOR VIEWFINDER OF FIXED POINT EXPOSURE METER CAMERA

[75] Inventors: Hiroshi Kurei; Tetsuji Shono, both of Kawagoe, Japan

[73] Assignee: Asahi Kogaku Kogyo Kabushiki Kaisha, Tokyo, Japan

[21] Appl. No.: 763,748

[22] Filed: Jan. 28, 1977

[30] Foreign Application Priority Data

Jan. 30, 1976 [JP] Japan .......................... 51-9458[U]

[51] Int. Cl.² ............................................... G03B 17/20
[52] U.S. Cl. .................................................. 354/289
[58] Field of Search ....................... 354/53, 54, 55, 56, 354/57, 289

[56] References Cited

U.S. PATENT DOCUMENTS

| | | | |
|---|---|---|---|
| 3,820,132 | 6/1974 | Lindner | 354/53 X |
| 4,037,235 | 7/1977 | Ueda | 354/53 X |

*Primary Examiner*—Michael L. Gellner
*Attorney, Agent, or Firm*—Sughrue, Rothwell, Mion, Zinn and Macpeak

[57] ABSTRACT

A shutter speed setting dial is rotationally coupled to a spring biased shutter speed display dial by a string and drum arrangement. The peripheral edge of the display dial, bearing shutter speed markings, extends into one side of a viewfinder frame adjacent a column of LEDs associated with a fixed point exposure meter display. Tabs projecting from a viewfinder frame border mask opposite the center LED bracket the set shutter speed marking, thereby enabling the user to quickly observe both the shutter speed and energized LED with a single glance.

1 Claim, 4 Drawing Figures

SHUTTER SPEED DISPLAY FOR VIEWFINDER OF FIXED POINT EXPOSURE METER CAMERA

BACKGROUND OF THE INVENTION

This invention relates to a shutter speed display arrangement for the viewfinder of a camera having a fixed point type of exposure meter.

In cameras having a built-in exposure meter it is common to position a light measurement display index at one edge of the viewfinder. In addition, the value set by a shutter speed dial is also typically displayed in the viewfinder for convenience of operation. In the past, however, these two indications have been separately displayed on the right and left sides of the viewfinder picture frame, for example, and therefore the user must inconveniently look to both sides to ascertain the two indications.

SUMMARY OF THE INVENTION

It is an object of this invention to eliminate the above-described difficulties. More specifically, the present invention reduces the inconvenience in operating the conventional camera by arranging both the index section of a fixed point exposure meter and the index section of a shutter speed dial at the same position in the viewfinder.

Briefly, and in accordance with the present invention, a shutter speed setting dial is rotationally coupled to a spring biased shutter speed display dial by a string and drum arrangement. The peripheral edge of the display dial, bearing shutter speed markings, extends into one side of a viewfinder frame adjacent a column of LEDs associated with a fixed point exposure meter display. Tabs projecting from a viewfinder frame border mask opposite the center LED bracket the set shutter speed marking, thereby enabling the user to quickly observe both the shutter speed and energized LED with a single glance.

DETAILED DESCRIPTION OF THE PREFERRED EMBODIMENTS

Figure 1:
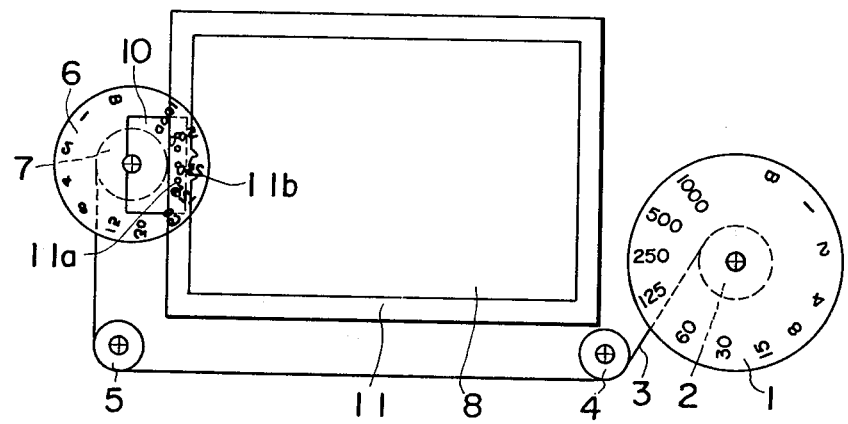
FIG. 1 shows a plan view of a shutter speed display device according to the present invention.
Figure 2:
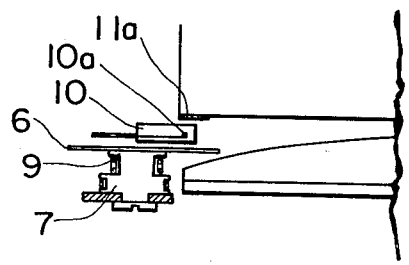
FIG. 2 shows a sectional view of a shaft arrangement for turning the shutter speed display dial of FIG. 1.

Referring now to the drawings, FIG. 1 shows a winding drum 2 secured to a shutter speed setting dial 1, with one end of a string 3 being fastened to the drum. The string 3 is laid over idler pulleys 4, 5, and extends toward the opposite side of a viewfinder picture frame 8. A shutter speed display dial 6 carries a winding drum 7 to which the other end of the string 3 is fastened. The winding drum 7 is rotationally biased in a clockwise direction by a coil spring 9, as seen in FIG. 2.

Figure 3:
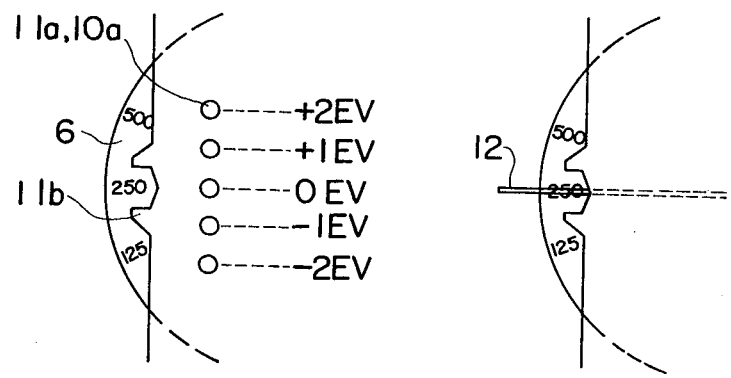
FIG. 3 shows an enlarged view of a fixed point exposure meter display section with light emission diodes viewed through a penta-prism.
Figure 4:
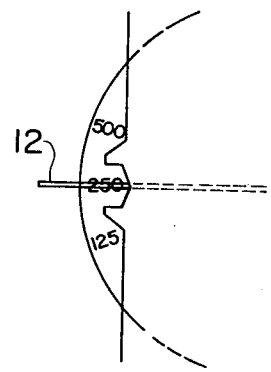
FIG. 4 shows a view similar to FIG. 3 but using an ammeter display.

The display dial 6 is positioned such that its peripheral edge, bearing appropriate shutter speed indications, appears in the viewfinder window. As clearly indicated by the shutter speed values carried on display dial 6, all of which read backwards, the viewfinder 11 and display dial 6 are shown as seen from behind the pentaprism. Thus, the camera operator will see the display dial of FIG. 1 from the opposite side so that it protrudes from the right side of the viewfinder as shown in FIGS. 3 and 4. The setting dial 1, on the other hand, is illustrated as seen by the camera operator, so that a clockwise rotation of the setting dial 1 from a higher to lower shutter speed value will result in the display dial 6, as seen by the operator, also rotating in a clockwise direction from a higher to lower shutter speed value.

An LED (light emitting diode) unit 10 comprises five light emitting elements 10a. The circuit of the LED unit is so designed that the central element is energized and illuminated when the exposure conditions are most suitable, while the two adjacent or flanking elements and the two outermost elements are energized when the exposure value is $\pm 1E_V$ and $\pm 2E_V$, respectively. The elements are arranged so that they can be observed through the holes 11a of a mask 11 surrounding the viewfinder picture frame. The indications on the shutter speed display dial 6 correspond to those on the shutter speed setting dial 1, and are arranged so that the speed setting appears adjacent the central light emitting element in the LED unit.

Index tabs 11b are provided on one edge of the mask 11 to bracket the shutter speed display value opposite the central light emitting element, as best seen in FIG. 3.

In the embodiment described above, light emitting diodes are employed as the display elements, but an ammeter pointer 12 or a liquid crystal can also be use, as shown in FIG. 4.

In the arrangement described above, a desired shutter speed value set by the dial 1 is displayed at the edge of the viewfinder, and the lens diaphragm or aperture ring is then turned until the central light emitting element becomes energized, whereby suitable photographic conditions are established. If the central element cannot be illuminated by turning the diaphragm ring, then the shutter speed dial 1 must be set to a different value. Since the shutter speed display dial 6 rotates in the opposite direction from the shutter speed setting dial 1, and the arrangement of the speed indications is counter-clockwise on the display dial from the lowest speed to the highest, if a light emitting element on the positive or overexposure side is energized, then the shutter speed setting dial is turned counterclockwise to a higher speed. This will cause the display dial to rotate in a direction to a higher speed, however, since the viewer sees the display dial from the opposite side of FIG. 1, a counter clockwise rotation of the setting dial 1 will cause the display dial, as seen through the viewfinder, to rotate counterclockwise while the illuminated LED translates downwardly. Since the rotation of the setting dial in one direction causes the display dial and illuminated indicator to move in the same direction, the operator can quickly and visually determine the appropriate speed setting direction necessary to provide suitable photographic conditions.

What is claimed is:

1. A combined shutter speed display and fixed point exposure meter for a camera viewfinder comprising:
   a rotatable shutter speed setting dial;
   a plurality of aligned indicator elements positioned along a side of the viewfinder picture frame;
   a rotatable shutter speed display dial operatively coupled to the setting dial for rotation therewith, the peripheral edge of the display dial bearing appropriate shutter speed markings and extending into the viewfinder picture frame adjacent said indicator elements, the rotational direction of said display dial and translation direction of said indicator elements as seen through said viewfinder being the same as the rotational direction of said setting dial; and a mask surrounding said viewfinder, said mask having a plurality of aligned holes through which said indicator elements are visible and a pair of spaced tabs extending inwardly from said side of said picture frame opposite a center one of said holes for bracketing the set shutter speed marking on the display dial.

* * * * *